United States Patent [19]
Yang

[11] Patent Number: 5,667,239
[45] Date of Patent: Sep. 16, 1997

[54] ADJUSTABLE BALANCING MECHANISM FOR FOLDABLE TELESCOPE GOLF CART

[75] Inventor: David Yang, 1020 Wickham Dr., Moraga, Calif. 94556

[73] Assignee: David Yang, Moraga, Calif.

[21] Appl. No.: 698,112

[22] Filed: Aug. 15, 1996

[51] Int. Cl.[6] ..................... B62B 1/16
[52] U.S. Cl. ............. 280/646; 280/47.35; 280/DIG. 6; 248/96
[58] Field of Search ............... 280/655, 655.1, 280/646, 47.19, 47.23, 47.26, 47.27, 47.28, 47.315, DIG. 6, 652; 248/96

[56] References Cited

U.S. PATENT DOCUMENTS

| | | | |
|---|---|---|---|
| 2,902,287 | 9/1959 | Elias | 280/DIG. 6 |
| 3,100,048 | 8/1963 | Halverson | 248/96 |
| 3,926,448 | 12/1975 | Reichard | 280/DIG. 6 |
| 5,354,089 | 10/1994 | Sohrt et al. | 280/645 |

Primary Examiner—Brian L. Johnson
Assistant Examiner—Bridget Avery

[57] ABSTRACT

A swing arm assembly is used as an adjustable balancing mechanism for the foldable telescope golf cart. The swing arm assembly adjusts the inclined position of the golf bag on the cart, and thus adjusts the center gravity location of the golf clubs. By selecting a proper length and rotational angle of the swing arm, it is possible to position the center gravity of the entire cart assembly in line with the center line of the wheels. As a result, the golf cart is maintained in a balanced position without imposing its weight upon the golfer, which reduces the effort and stress in pulling the cart, and makes the golf game more enjoyable.

8 Claims, 5 Drawing Sheets

ADJUSTABLE BALANCING MECHANISM FOR FOLDABLE TELESCOPE GOLF CART

BACKGROUND OF THE INVENTION

A foldable telescope golf cart has been commonly used by golfers for carrying the golf bag with clubs. In the prior art design (FIG. 1), the cart typically consists of an upper frame and a lower frame pivotably jointed; a pair of wheel assemblies attached to the lower frame; links interconnecting the wheel assemblies and the upper frame; and saddles fixedly attached to the lower frame for supporting and securing the golf bag. By rotating the upper frame at the pivot joint toward the lower frame, the cart frames and wheel assemblies are folded simultaneously to a compact size.

An ideal telescope golf cart shall be capable of maintaining the cart in a balanced position and having the entire weight of cart assembly imposed upon the wheels during traveling. The golfer shall not be subject to the weight of the cart assembly, and shah only be required to exercise negligible force against the wheel's rotational friction as he is pulling the cart. Such an ideal telescope golf cart is possible only if the center gravity (c.g.) of the cart assembly including the weight of golf clubs is maintained in line with the center line of the wheels at all time during traveling.

There are several factors affect the location of c.g. of the golf cart assembly: (1). The c.g. of the golf clubs which dominantly determines the c.g. location of the entire cart assembly; the c.g. location in a golf club is affected by the individual club's design and material; the c.g. of a golf club with a lighter graphite shaft is located closer to the club head than that of a golf club with a steel shaft; as the golf bag being placed on an inclined golf cart with the golf club heads in the upright position, the c.g. of the golf clubs is elevated. (2). The respective incline angle of the cart corresponding to the cart's initial standing position and traveling position; as the cart being rotated from its initial standing position to traveling position, the incline angle of the cart is decreased, and the c.g. of the cart assembly is shifted forward to the front end of the cart; the greater change in the incline angle, the further movement of the c.g. of the cart assembly. (3). The height of the golfer which determines the incline angle of the cart during traveling; a golfer with a shorter height requires a smaller incline angle of the cart to comfortably pull the cart, and therefore the c.g. of the cart could move further to the front and closer to the golfer.

It is understood that the above factors have been mostly overlooked in the prior art design of golf cart, and the golfer has no means of adjusting the c.g. location of the cart. This may be due to the fact that the foldability design requirement of the cart imposes certain limitations on the configuration of the cart. In the prior art design, the c.g. of the cart in a standing position is closely located behind the center line of the wheels. (FIG. 1) As the cart being changed to a traveling position, the incline angle of the cart is reduced, and the c.g. moves forward passing the center line of the wheels. (FIG. 2) As a result, the golfer is imposed upon the weight of the cart assembly, and must produce a upward force to balance the cart during cart pulling. In the prior art design, attempts have been made to make the length of the upper frame of the cart adjustable, which have little effect in balancing the cart. In fact, these attempts could have an adverse effect of moving the c.g. of the cart closer to the golfer, and consequently increasing the loads on the golfer.

After considering the above factors, the basic principal for the conceptual design of the present invention is developed as follows: Since both the golf cart and the golf bag rotate about the same degree when the cart is changed from its initial standing position to traveling position, it is advantageous to design a balancing mechanism capable of rotating the golf bag in the direction opposite to the cart's rotation to offset the effect of c.g. movement. For example, if the cart is required to rotate 30 degree counter clockwise from the initial standing position to the traveling position, the balancing mechanism should be capable of rotating the golf bag 30 degree clockwise before rotating the cart from the standing position to traveling position. As a result, the effect of c.g. movement of the cart assembly is mostly eliminated. Since the golf cart may be required to rotate to a different angle under a different condition, such a balancing mechanism should be able to adjust the rotation angle of the golf bag accordingly, and consequently position the c.g. of the cart assembly at the center line of the wheels.

OBJECTS AND SUMMARY OF THE INVENTION

It is one of the objects of the present invention to provide the foldable telescope golf cart with a balancing mechanism to adjust the c.g. location of the cart assembly, so that the c.g. of the cart assembly falls in line with the center line of the wheels at all times during traveling.

It is a further object of the present invention to make such an adjustable balancing mechanism easily foldable, so that the entire telescope golf cart can be folded to a compact size for storage or transportation.

It is another object of the present invention to provide such a balancing mechanism with an attached tote bag for storage of the golfer's personal items.

In accordance with the present invention, a swing arm assembly, which is used as an adjustable balancing mechanism, is attached to the cart frame to support and secure the golf bag. (FIG. 3) By adjusting the rotational angle and/or the length of the swing arm, it is possible to adjust the incline angle of the golf bag and the c.g. location of the golf clubs, and consequently position the c.g. of the cart assembly at the center line of the wheels. (FIG. 4) By rotating the swing arm adjacent to the cart frame, it is then possible to fold the entire cart to a compact size. (FIG. 5) By creating a rotation angle between the golf bag and the cart frame, an extra space is created underneath the golf bag, and a tote bag can be possibly installed for adding the storage capacity of the golf cart. (FIG. 6)

DETAILED DESCRIPTION OF THE INVENTION

Figure 1:
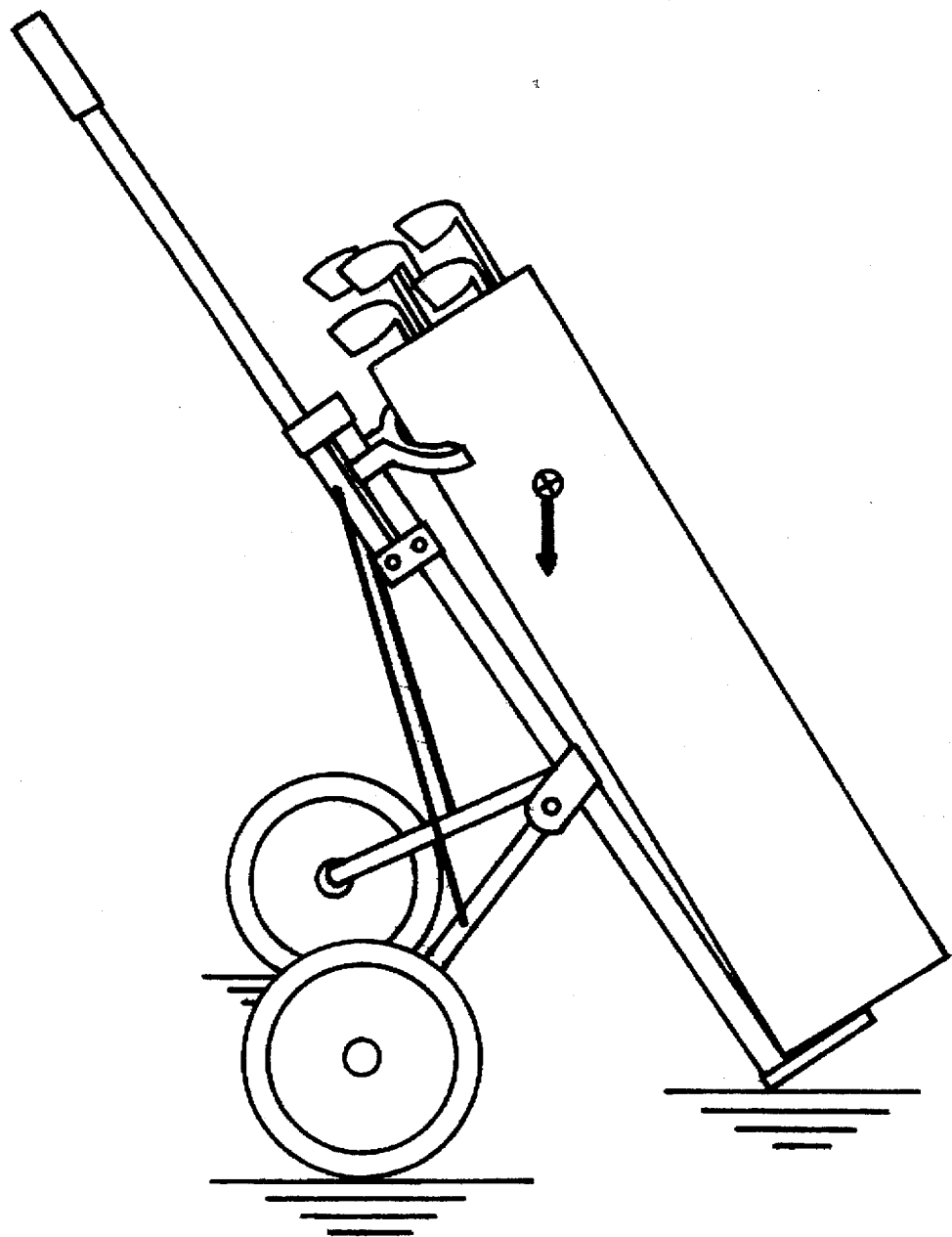
FIG. 1 represents an isometric view of a foldable telescope golf cart of prior art design, illustrating the center gravity of the cart assembly closely located behind the center line of wheels in a standing position.
Figure 2:
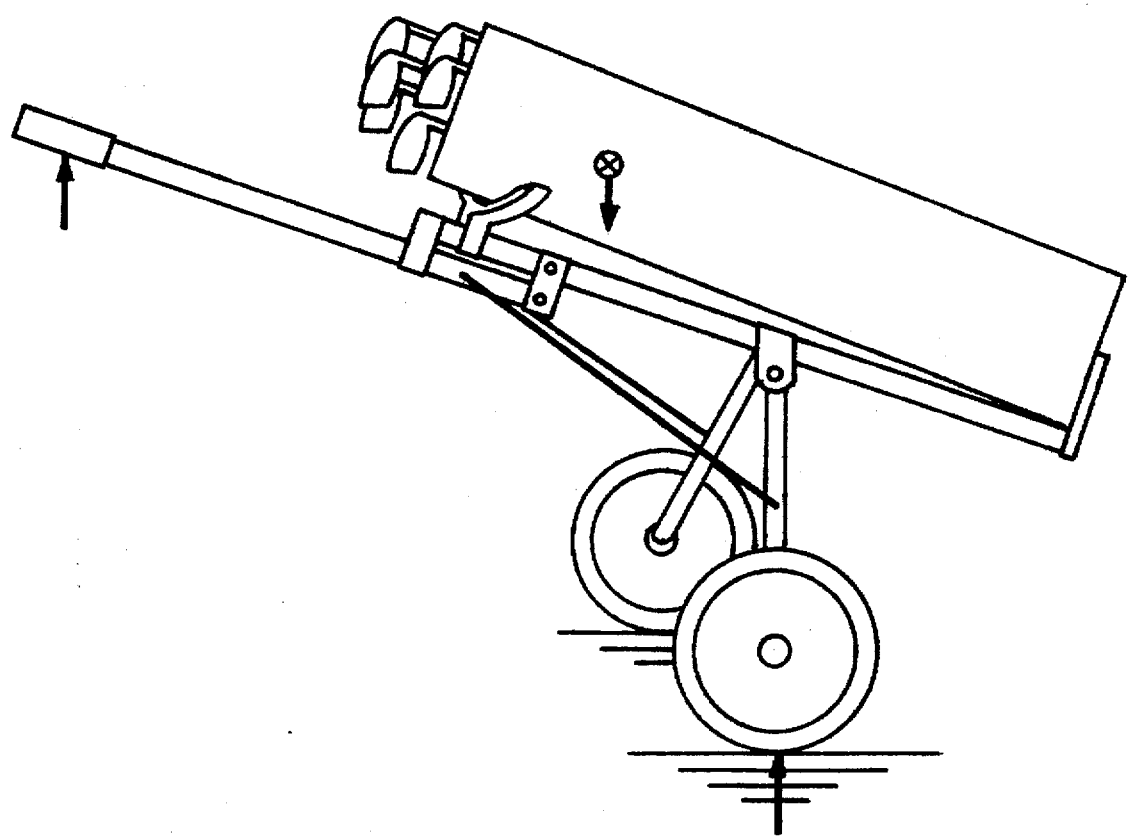
FIG. 2 represents an isometric view of a foldable telescope golf cart of prior art design, illustrating the center gravity of the cart assembly passing the center line of the wheels in a traveling position.
Figure 3A:
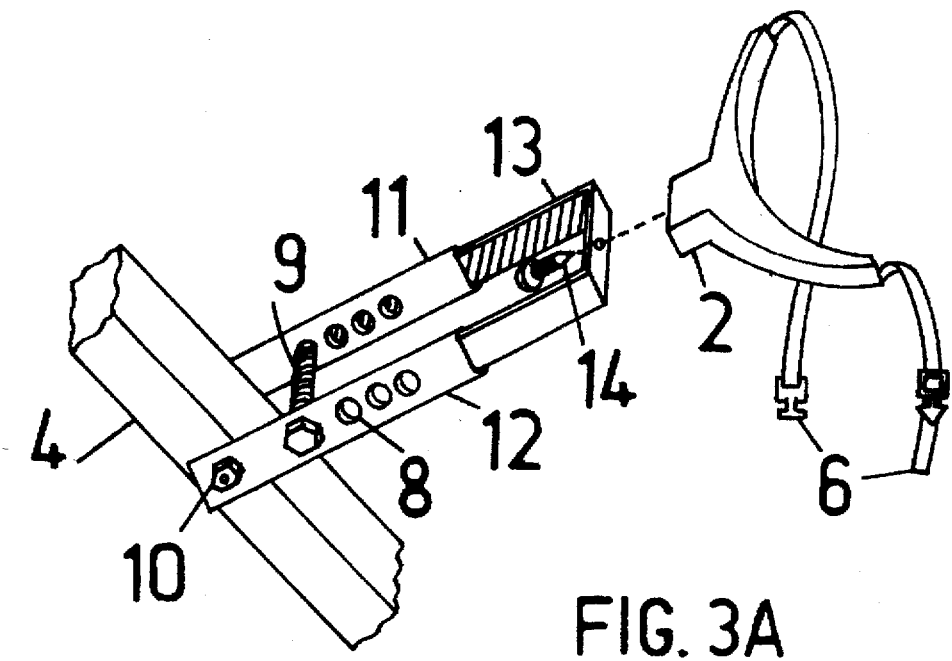
FIG. 3A represents a perspective view of the adjustable balancing mechanism with a retractable sliding arm in accordance with the present invention, in which the arm length is adjustable.
Figure 3:
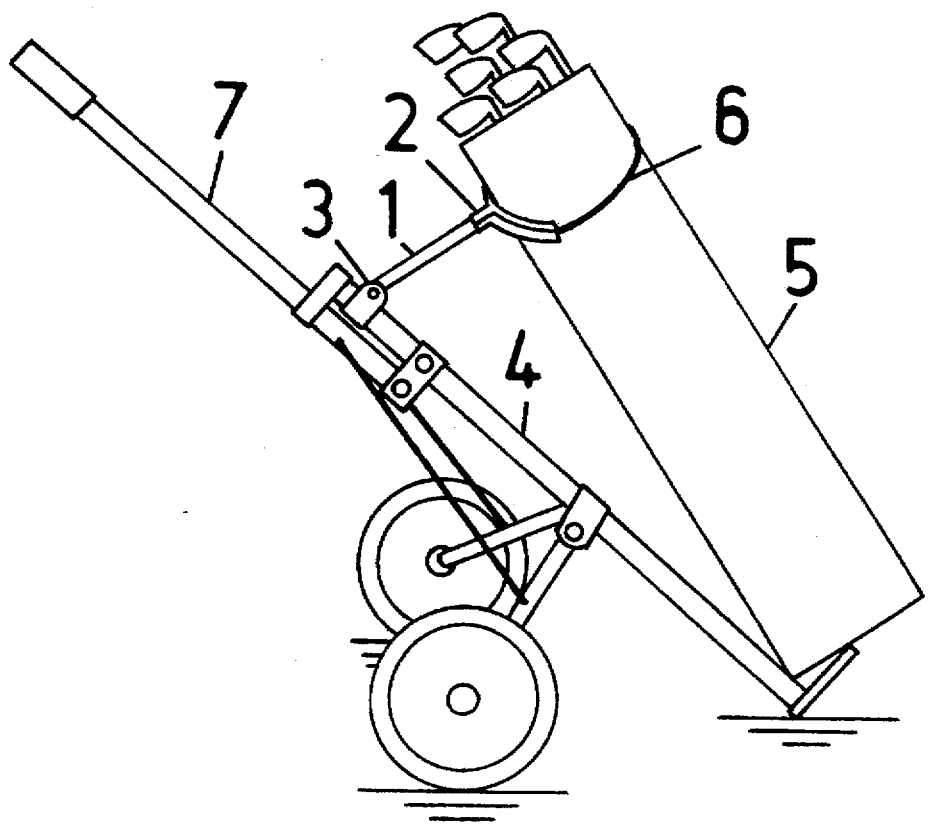
FIG. 3 represents an isometric view of a foldable telescope golf cart with an adjustable balancing mechanism in accordance with the present invention, illustrating the incline angle of the golf bag produced by such a balancing mechanism while the cart is in a standing position.
Figure 4:
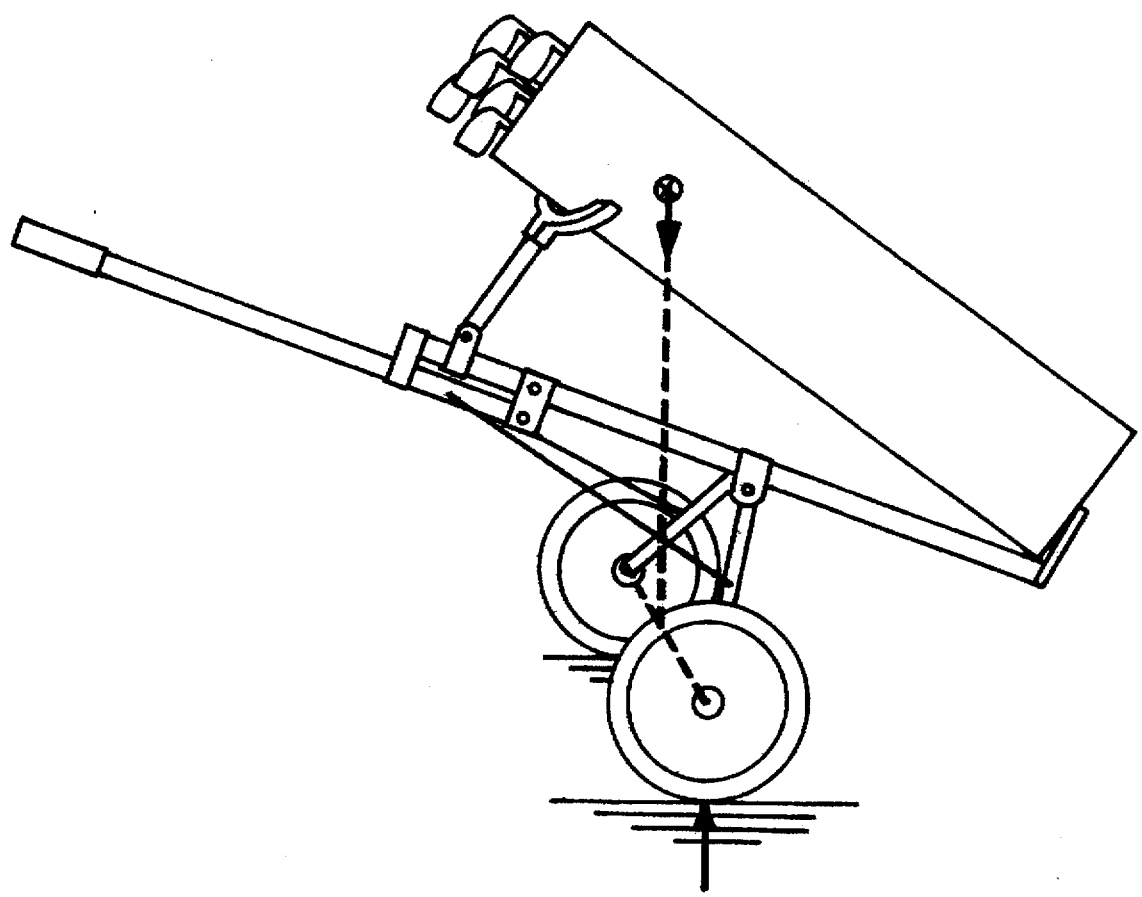
FIG. 4 represents an isometric view of a foldable telescope golf cart with an adjustable balancing mechanism in accordance with the present invention, illustrating the center gravity of the cart assembly being positioned at the center line of the wheels while the cart is in a traveling position.

A foldable telescope golf cart with an adjustable balancing mechanism in accordance with the present invention is represented in FIG. 3. The adjustable balancing mechanism is represented by the swing arm assembly consisting of the swing arm 1, the saddle 2, and the mounting bracket 3 which pivotably connects the swing arm 1 to the lower cart frame 4, and allows the swing arm 1 to rotate freely. The saddle 2 is provided with a strip 6 for securing the golf bag 5 to the saddle, which prevents the movement of the swing arm and locks the swing arm at the predetermined position. FIG. 3 represents the schematic design of the swing arm assembly. However, the design details of the swing arm assembly in accordance with the present invention are not limited by FIG. 3. It is considered to be within the scope of the present invention to adopt a different configuration of the swing arm assembly other than shown in FIG. 3, provided such a swing arm assembly performs the function of supporting and rotating the golf bag, which is capable of adjusting the incline angle of the golf bag and the c.g. location of the golf clubs.

In accordance with the present invention, the swing arm 1 can be of a fixed length, or preferably of an adjustable length. FIG. 3A represents the swing arm assembly with a retractable sliding arm in which the swing arm length is adjustable. The retractable sliding arm consisting of tracks 11 and 12, and runner 13. The tracks 11 and 12 are pivotably connected to the lower cart frame 4 at location 10 to allow the swing arm assembly to rotate freely at location 5. The runner 13, which is connected to the saddle 2 with a fastener 14, is capable of sliding within tracks 11 and 12. The tracks 11 and 12 are provided with a plurality of holes 8 on the side walls so that stopper 9 can be inserted into one of the holes 8 to adjust the length of the swing arm. The strip 6 is used to secure the golf bag to the saddle 2. It is considered to be within the scope of the present invention to adopt a different means of adjusting the swing arm length other than shown in FIG. 3A.

In accordance with the present invention, the mounting bracket 3 in FIG. 3 can be alternatively attached to the upper cart frame 7. The mounting bracket 3 can also be alternatively slidable along the earl frame.

Figure 6:
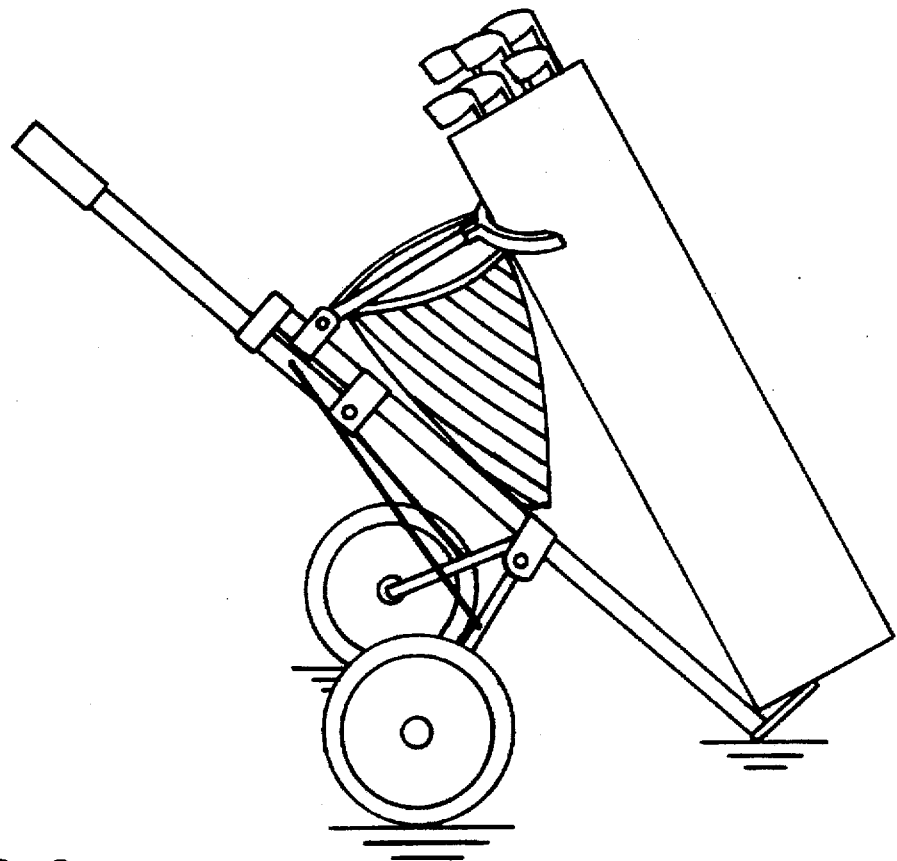
FIG. 6 represents an isometric view of a foldable telescope golf cart with an adjustable balancing mechanism in accordance with the present invention, illustrating a tote bag being attached to the balancing mechanism for adding storage capacity.
Figure 5:
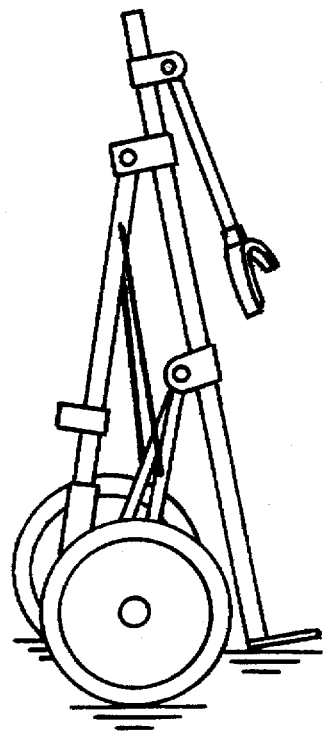
FIG. 5 represents an isometric view of a foldable telescope golf cart with an adjustable balancing mechanism in accordance with the present invention, illustrating the cart being folded to a compact size.

In accordance with the present invention, the swing arm assembly rotates the golf bag and creates an incline angle between the golf bag and the cart frame, which creates an extra space underneath the swing arm assembly and the golf bag. FIG. 6 represents a tote bag being attached to the swing arm assembly for storage of the golfer's personal items.

The swing arm assembly in accordance with the present invention can be easily retrofitted to any telescope golf cart of prior art design. The golfer can easily adjust this swing arm assembly to position the c.g. of the cart assembly at the center line of wheels under any individual circumstances during cart traveling. Therefore,

What is claimed is:

1. An adjustable balancing mechanism for a foldable telescope golf cart, capable of maintaining the golf cart in a balanced position during cart traveling by means of positioning the center gravity c.g. of a golf bag and golf cart assembly at a center line of a wheels, said balancing mechanism adjusting the c.g. location of the assembly by means of rotating a golf bag on the golf cart, enabling adjustment of an incline angle of the golf bag during cart traveling, which shifts the c.g. of the assembly to the front of the golf can by reducing said incline angle of the golf beg, and shifts the c.g. of the golf clubs to the back of the golf cart by increasing said incline angle of the golf beg, and thus controlling a horizontal distance between the center line of the wheels and the c.g. of the assembly, making it possible to position the c.g. of the assembly at the center line of the wheels;

said adjustable balancing mechanism comprising:

a rotatable swing arm assembly consisting of a swing arm, a saddle, a strip, and a mounting bracket; said mounting bracket pivotably connecting one end of said swing arm to a cart frame, enabling said swing arm to rotate freely; said saddle connecting to the other end of said swing arm, supporting the golf bag in an incline position; said strip securing the golf bag to said saddle, locking said swing arm in position; said swing arm adjusting the incline angle of the golf bag by rotating at a pivot joint connecting said mounting bracket, having a sufficient length to create an angular displacement of the golf bag, which offsets the angular displacement of the c.g. of the assembly as the cart is rotated from an initial standing position to a traveling position, locating the c.g. of the cart assembly at the center line of the wheels during cart traveling.

2. The balancing mechanism of claim 1 wherein said swing arm comprising a retractable sliding arm, enabling adjustment of the incline angle of the golf beg by adjusting the length of said swing arm.

3. The balancing mechanism of claim 2 wherein said swing arm having a plurality of holes on a side walls that allow a stopper to lock the swing arm at a predetermined length.

4. The balancing mechanism of claim 1 wherein said swing arm assembly is attached to a lower cart frame.

5. The balancing mechanism of claim 1 wherein said swing arm assembly is attached to an upper cart frame.

6. The balancing mechanism of claim 1 wherein said swing arm is pivotably connected to a slidable mounting bracket on the cart frame, enabling the adjustment of the incline angle of the golf bag by sliding said mounting bracket on the cart frame.

7. The balancing mechanism of claim 1 wherein said saddle is pivotably connected to said swing arm, enabling an adjustable saddle angle in support of the golf bag.

8. The balancing mechanism of claim 1 wherein a tote bag is attached to said swing arm assembly for adding storage capacity of the golf cart.

* * * * *